United States Patent
Yao et al.

(10) Patent No.: US 8,907,605 B2
(45) Date of Patent: Dec. 9, 2014

(54) CIRCUIT STRUCTURE ENABLING UPGRADED MOS TRANSISTOR HEAT DISSIPATION ABILITY

(71) Applicant: Asia Vital Components (China) Co., Ltd., Shenzhen (CN)

(72) Inventors: Bao-Lin Yao, Shenzhen (CN); Qing-Wu Hu, Shenzhen (CN)

(73) Assignee: Asia Vital Components (China) Co., Ltd., Shenzhen (CN)

( * ) Notice: Subject to any disclaimer, the term of this patent is extended or adjusted under 35 U.S.C. 154(b) by 98 days.

(21) Appl. No.: 13/723,128

(22) Filed: Dec. 20, 2012

(65) Prior Publication Data
US 2014/0175952 A1 Jun. 26, 2014

(51) Int. Cl.
*H02P 6/00* (2006.01)
*H02K 29/00* (2006.01)

(52) U.S. Cl.
CPC ..................................... *H02K 29/00* (2013.01)

USPC ............ 318/400.29; 318/400.26; 318/400.01; 318/700; 318/34

(58) Field of Classification Search
CPC ....................................................... H02K 29/00
USPC ............. 318/400.29, 400.26, 400.01, 700, 34
See application file for complete search history.

(56) References Cited

U.S. PATENT DOCUMENTS 5,483,436 A * 1/1996 Brown et al. ................... 363/98

* cited by examiner

*Primary Examiner* — David S Luo
(74) *Attorney, Agent, or Firm* — C. G. Mersereau; Nikolai & Mersereau, P.A.

(57) ABSTRACT

A circuit structure applied to a motor and enabling upgraded MOS transistor heat dissipation ability is disclosed. The circuit structure includes a motor driving unit and a signal processing unit. The signal processing unit is connected to the motor driving unit for maintaining a first and a third switch of the motor driving unit at a constant turn-on voltage and boosting turn-on voltages of a second and a fourth switch of the motor driving unit, so as to effectively upgrade the heat dissipation ability of the first, second, third and fourth switches.

15 Claims, 4 Drawing Sheets

CIRCUIT STRUCTURE ENABLING UPGRADED MOS TRANSISTOR HEAT DISSIPATION ABILITY

FIELD OF THE INVENTION

The present invention relates to a circuit structure enabling upgraded MOS transistor heat dissipation ability, and more particularly, to a circuit structure that upgrades the heat dissipation ability of MOS transistors thereof and therefore has good heat dissipation performance.

BACKGROUND OF THE INVENTION

Due to the progress in different technological fields and the development in the computer industry, many light and compact products, such as the notebook computers, have become the main stream in the market. For such light and compact electronic products, their system stability and product performance or even service life are usually affected by the heat dissipation performance thereof. Taking a computer system as an example, to enable quick dissipation of the heat energy produced by the computer system during operation thereof, a fan is usually mounted to the computer system as a heat dissipation device thereof, so that the computer system can maintain normal operation in an environment having a proper working temperature.

Figure 1:
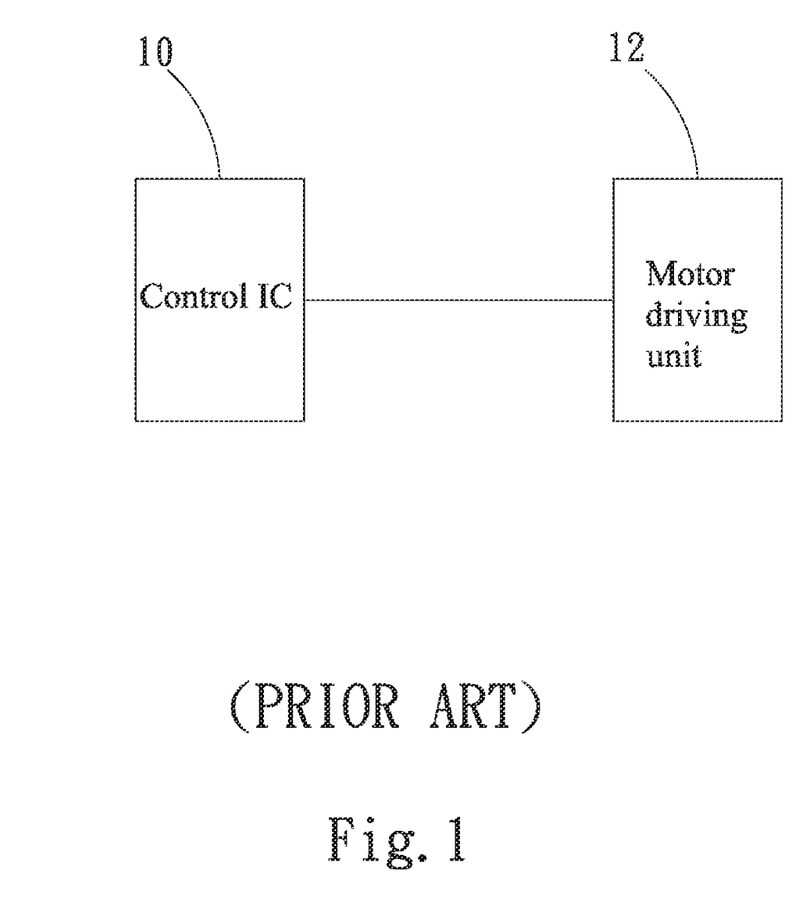
FIG. 1 is a block diagram of a prior art fan motor driving circuit.

Generally speaking, the fan used with a computer system for heat dissipation is usually driven by a brushless direct-current (DC) motor. As shown in FIG. 1, the currently available DC motor has a driving circuit mainly including a control integrated circuit (IC) 10, which transmits a pulse-width modulation (PWM) signal to a motor driving unit 12, so as to drive the motor to operate. However, when the p-type metal-oxide-semiconductor field-effect (PMOS) transistor in the motor driving unit 12 has an input power supply that is a low voltage, the voltage between the gate and the source (i.e. the so-called voltage Vgs) of the PMOS transistor would be relatively small, rendering the PMOS transistor in a not fully turned-on state. As a result, the PMOS transistor would have an increased internal resistance (i.e. an increased turn-on resistance) Rds, and accordingly, an increased turn-on power. Since the turn-on resistance (Rds) of the PMOS transistor has relation to the junction temperature (Tj) thereof, the increased turn-on resistance (Rds) also results in increased case temperature (Tc) and junction temperature (Tj) of the PMOS transistor. Therefore, the PMOS transistor in the conventional motor driving circuit has the problem of insufficiently derated junction temperature (Tj).

On the other hand, when the input voltage is a high voltage, the voltage between the gate and the source (Vgs) of the PMOS transistor is relatively large and tends to exceed the specification value therefor or have the problem of insufficiently derated voltage (Vgs).

Further, the control IC 10 usually has an operating voltage and an output signal (i.e. the PWM signal) both being high-level voltage of 5V, which is mainly used as the turn-on voltage between the gate and the source of the n-type metal-oxide-semiconductor field-effect (NMOS) transistor in the motor driving unit 12 (i.e. the turn-on voltage Vgs of the NMOS transistor). However, this high-level voltage of 5V is relatively small, rendering the NMOS transistor in a not fully turned-on state. As a result, the NMOS transistor would have an increased turn-on resistance (Rds), and accordingly, an increased turn-on power. Since the turn-on resistance (Rds) of the NMOS transistor has relation to the junction temperature (Tj) thereof, the increased turn-on resistance (Rds) also results in increased case temperature (Tc) and junction temperature (Tj) of the NMOS transistor. Therefore, the NMOS transistor in the conventional motor driving circuit tends to have the problem of insufficiently derated junction temperature (Tj). Due to these reasons, the NMOS transistor and the PMOS transistor in the conventional motor driving unit 12 always have poor heat dissipation ability that could not be effectively upgraded up to now.

In brief, the conventional fan motor driving circuit has the following disadvantages: (1) poor heat dissipation performance; (2) the voltage (Vgs) of the PMOS transistor could not be stabilized and therefore tends to exceed the specification of the turn-on voltage of the PMOS transistor and cause insufficiently derated junction temperature (Tj) of the PMOS transistor; and (3) the turn-on voltage (Vgs) of the NMOS transistor could not be effectively boosted to result in insufficiently derated junction temperature (Tj) of the NMOS transistor.

It is therefore tried by the inventor to work out a way for overcoming the problems and disadvantages in the conventional fan motor driving circuit.

SUMMARY OF THE INVENTION

A primary object of the present invention is to effectively solve the above-mentioned problems by providing a circuit structure that has good heat dissipation performance to upgrade the heat dissipation ability of MOS transistors thereof.

Another object of the present invention is provide a circuit structure, with which a voltage (Vgs) between a gate and a source of a PMOS transistor of a motor driving unit thereof is maintained in a stable state, so as to effectively solve the problem of insufficiently derated junction temperature (Tj) encountered by the conventional PMOS transistor and ensure that the turn-on voltage (Vgs) of the PMOS transistor does not exceed the element specification thereof.

A further object of the present invention is provide a circuit structure, with which a voltage (Vgs) between a gate and a source of an NMOS transistor of a motor driving unit thereof is boosted, so as to effectively solve the problem of insufficiently derated junction temperature (Tj) encountered by the conventional NMOS transistor.

To achieve the above and other objects, the circuit structure enabling upgraded MOS transistor heat dissipation ability according to the present invention is applied to a motor, and includes a motor driving unit and a signal processing unit. The motor driving unit includes a first switch, a second switch, a third switch and a fourth switch, which respectively have a first terminal end, a second terminal end and a third terminal end. The first and the third switch are connected at their third ends to the third ends of the second and the fourth switch, respectively; and the first and the second switch are connected at their second ends to the second ends of the third and the fourth switch, respectively.

The signal processing unit includes a first voltage stabilizer, a second voltage stabilizer, a first booster and a second booster. The first voltage stabilizer is connected at an end to the first end of the first switch and at another end to the second end of the first switch and an input voltage for stabilizing a voltage between the first end and the second end of the first switch. The second voltage stabilizer is connected at an end to the first end of the third switch and at another end to the second end of the third switch and the input voltage for stabilizing a voltage between the first end and the second end of the third switch. The first booster is connected to the first end of the second switch for boosting a received first signal and outputting the boosted first signal to the first end of the second switch. The second booster is connected to the first end of the fourth switch for boosting a received second signal and outputting the boosted second signal to the first end of the fourth switch.

With the circuit structure of the present invention, it is able to effectively upgrade the heat dissipation ability of the first, the second, the third and the fourth switch of the motor driving unit and to effectively solve the problem of insufficiently derated junction temperature (Tj) of the first, the second, the third and the fourth switch.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

The present invention will now be described with a preferred embodiment thereof and with reference to the accompanying drawings. For the purpose of easy to understand, elements that are the same in the preferred embodiment are denoted by the same reference numerals.

Figure 2:
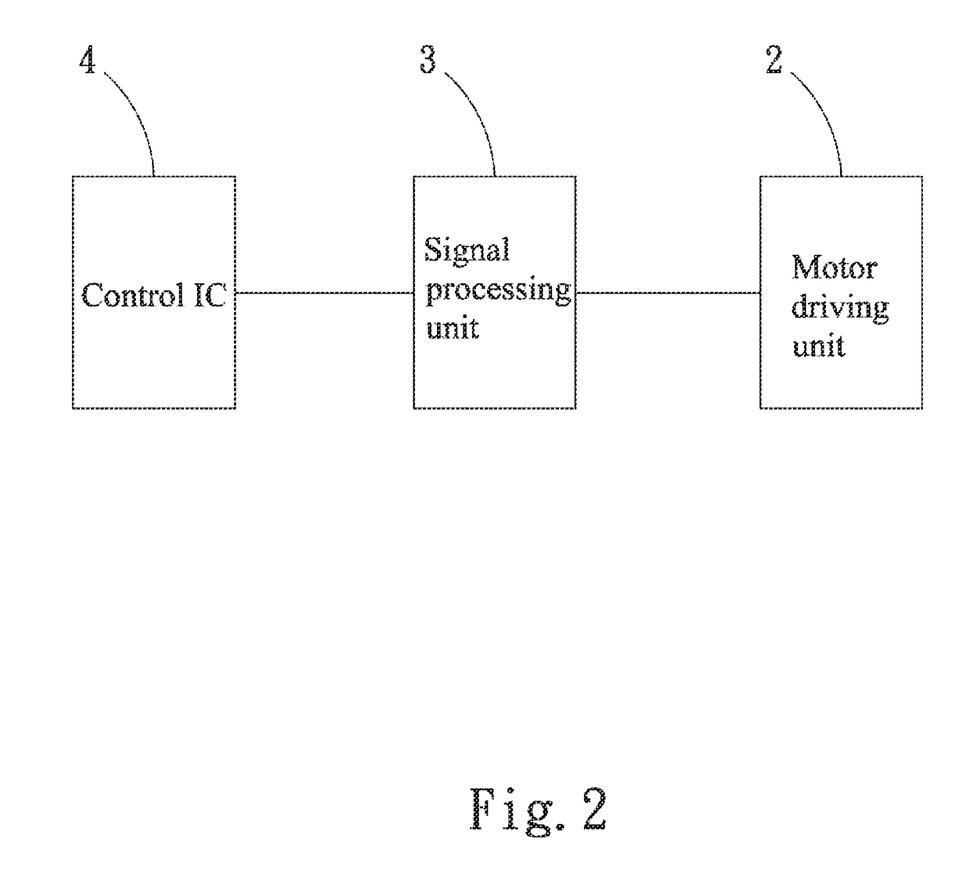
FIG. 2 is a general block diagram of a circuit structure enabling upgraded MOS transistor heat dissipation ability according to a preferred embodiment of the present invention.
Figure 3:
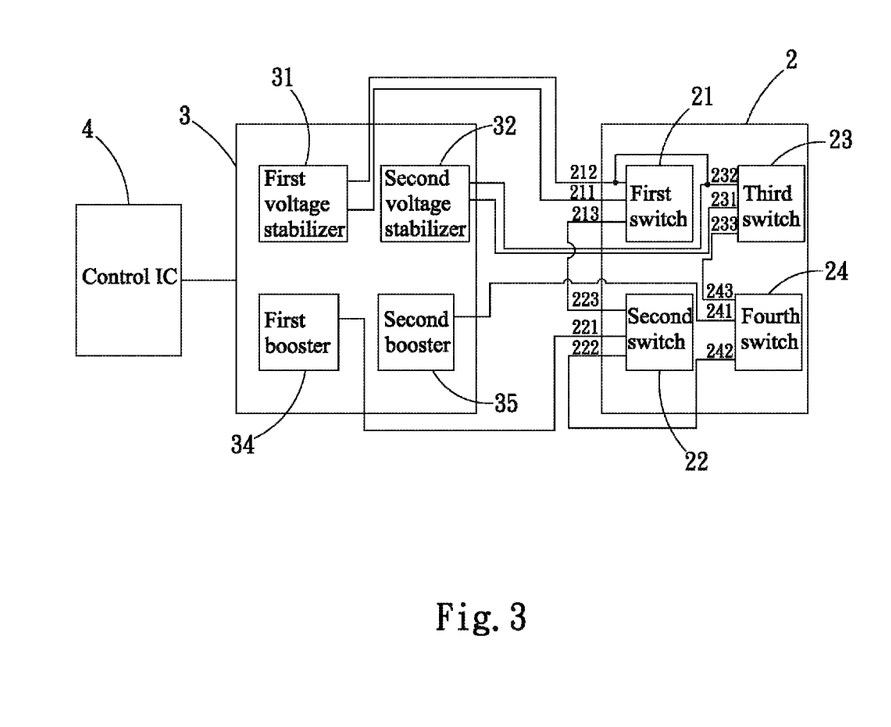
FIG. 3 is a detailed block diagram of the circuit structure enabling upgraded MOS transistor heat dissipation ability according to the preferred embodiment of the present invention.
Figure 4:
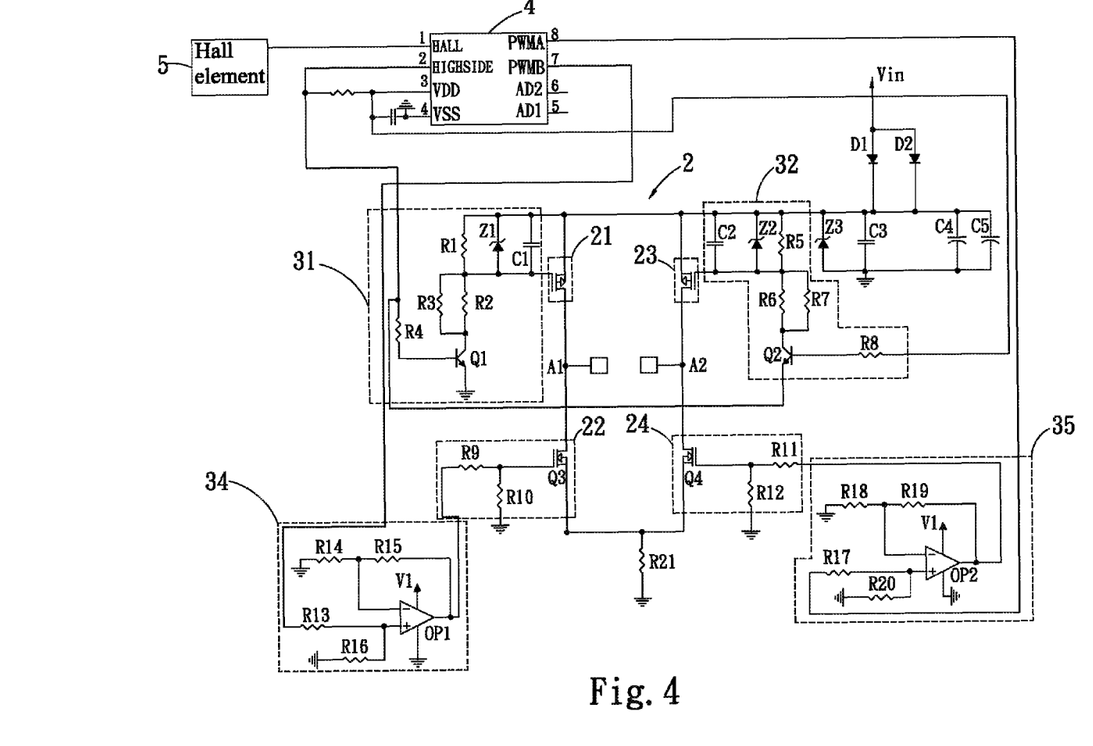
FIG. 4 is a circuit diagram of the circuit structure enabling upgraded MOS transistor heat dissipation ability according to the preferred embodiment of the present invention.

Please refer to FIGS. 2 and 3 that are general and detailed block diagrams, respectively, of a circuit structure enabling upgraded MOS transistor heat dissipation ability according to a preferred embodiment of the present invention; and to FIG. 4 that is a circuit diagram of the circuit structure enabling upgraded MOS transistor heat dissipation ability according to the preferred embodiment of the present invention. The circuit structure of the present invention is applied to a motor. And, more particularly, the circuit structure in the illustrated preferred embodiment of the present invention is described as being used with a direct-current (DC) fan motor. As shown, the circuit structure of the present invention includes a motor driving unit 2 and a signal processing unit 3, which is connected to the motor driving unit 2 and a control integrated circuit (IC) 4. The motor driving unit 2 includes a first switch 21, a second switch 22, a third switch 23 and a fourth switch 24, which respectively have a first terminal end 211, 221, 231 and 241, a second terminal end 212, 222, 232 and 242, and a third terminal end 213, 223, 233 and 243.

The first and the third switch 21, 23 are connected at their third ends 213, 233 to the third ends 223, 243 of the second and the fourth switch 22, 24, respectively. That is, the first switch 21 is electrically connected at its third end 213 to the third end 223 of the second switch 22, and there is a first node A1 formed between their connection and electrically connected to an end of the motor (not shown); and the third switch 23 is electrically connected at its third end 233 to the third end 243 of the fourth switch 24, and there is a second node A2 formed between their connection and electrically connected to another end of the motor.

Further, the first and the second switch 21, 22 are connected at their second ends 212, 222 to the second ends 232, 242 of the third and the fourth switch 23, 24, respectively. That is, the first switch 21 is electrically connected at its second end 212 to the second end of the third switch 23, and the second switch 22 is electrically connected at its second end 222 to the second end 242 of the fourth switch 24.

Please refer to FIG. 3 along with FIG. 4. The signal processing unit 3 includes a first voltage stabilizer 31, a second voltage stabilizer 32, a first booster 34, and a second booster 35. The first voltage stabilizer 31 has an end connected to the first end 211 of the first switch 21, and another end connected to the second end 212 of the first switch 21 and an input voltage Vin. The first voltage stabilizer 31 is used to stabilize a voltage between the first end 211 and the second end 212 of the first switch 21 (i.e. the so-called Vgs or turn-on voltage). While the preferred embodiment of the present invention is described with the voltages at two ends of the first voltage stabilizer 31 being stably maintained at 12V, it is understood that, in practical implementation of the present invention, the voltages at two ends of the first voltage stabilizer can be maintained at a stable voltage value different from 12V. To do so, a user may select the specification of the first voltage stabilizer 31 according to a desired voltage value that is to be stably maintained at. For example, the user may select a first voltage stabilizer 31 of a specification of 13V or higher, so that the voltages at two ends of the first voltage stabilizer 31 are maintained at 13V.

By using the first voltage stabilizer 31 to stabilize the received input voltage Vin, it is able to maintain the turn-on voltage (Vgs) applied between the first end 211 and the second end 212 of the first switch 21 in a constant state. As a result, the turn-on resistance (Rds) of the first switch 21 at the time it is turned on is reduced. Accordingly, a junction temperature (Tj) and a case temperature (Tc) of the first switch 21 also reduce along with the turn-on resistance (Rds). In this manner, it is able to effectively solve the problem of insufficiently derated junction temperature (Tj) of the first switch 21, and to effectively ensure that the voltage (Vgs) between the first end 211 and the second end 212 of the first switch 21 does not exceed the allowable voltage specification thereof.

The second voltage stabilizer 32 has an end connected to the first end 231 of the third switch 23, and another end connected to the second end 232 of the third switch 23 and the input voltage Vin. The second voltage stabilizer 32 is used to stabilize a voltage between the first end 231 and the second end 232 of the third switch 23 (i.e. the so-called Vgs or turn-on voltage). In other words, the second voltage stabilizer 32 is used to maintain the turn-on voltage (Vgs) between the first end 231 and the second end 232 of the third switch1 23 in a constant state. In the illustrated preferred embodiment, both the second voltage stabilizer 32 and the first voltage stabilizer 31 are described with the voltages at their respective two ends being maintained at 12V. However, it is understood the present invention is not limited thereto.

By using the second voltage stabilizer 32 to stabilize the received input voltage Vin, it is able to maintain the turn-on voltage (Vgs) applied between the first end 231 and the second end 232 of the third switch 23 in a constant state. As a result, the turn-on resistance (Rds) of the third switch 23 at the time it is turned on is reduced. Accordingly, a junction temperature (Tj) and a case temperature (Tc) of the third switch 23 also reduce along with the turn-on resistance (Rds). In this manner, it is able to effectively solve the problem of insufficiently derated junction temperature (Tj) of the third switch 23, and to effectively ensure that the voltage (Vgs) between the first end 231 and the second end 232 of the third switch 23 does not exceed the allowable voltage specification thereof.

The first booster 34 is connected to the first end 221 of the second switch 22 for increasing or boosting the voltage of a first signal received from the control IC 4 and outputting the boosted first signal to the first end 221 of the second switch 22, so that the turn-on voltage (Vgs) applied between the second end 222 and the first end 221 of the second switch 22 is increased. As a result, the turn-on resistance (Rds) of the second switch 22 at the time it is turned on is reduced. Accordingly, a junction temperature (Tj) and a case temperature (Tc) of the second switch 22 also reduce along with the turn-on resistance (Rds). In this manner, it is able to effectively solve the problem of insufficiently derated junction temperature (Tj) of the second switch 22.

The second booster 35 is connected to the first end 241 of the fourth switch 24 for increasing or boosting the voltage of a second signal received from the control IC 4 and outputting the boosted second signal to the first end 241 of the fourth switch 24, so that the turn-on voltage (Vgs) applied between the second end 242 and the first end 241 of the fourth switch 24 is increased. As a result, the turn-on resistance (Rds) of the second switch 22 at the time it is turned on is reduced. Accordingly, a junction temperature (Tj) and a case temperature (Tc) of the fourth switch 24 also reduce along with the turn-on resistance (Rds). In this manner, it is able to effectively solve the problem of insufficiently derated junction temperature (Tj) of the fourth switch 24. Wherein, the first signal and the second signal are respectively a pulse width modulation (PWM) signal.

Please refer to FIG. 4 along with FIG. 3. The circuit structure of the present invention is described in further details as below.

The illustrated preferred embodiment is described with the first switch 21 being configured as a p-type metal-oxide-semiconductor field-effect (PMOS) transistor. However, it is understood the present invention is not limited thereto. In the first switch 21, the first end 211 is a gate, the second end 212 is a source, and the third end 213 is a drain. The second switch 22 includes a first MOS transistor Q3, a ninth resistor R9 and a tenth resistor R10. The first MOS transistor Q3 has a source and a drain forming the second end 222 and the third end 223 of the second switch 22, respectively. The ninth resistor R9 has an end connected to a gate of the first MOS transistor Q3 and an end of the tenth resistor R10, and another end forming the first end 221 of the second switch 22. The tenth resistor R10 has another end connected to ground. Wherein, the first MOS transistor Q3 in the preferred embodiment is configured as an n-type metal-oxide-semiconductor field-effect (NMOS) transistor.

The illustrated preferred embodiment is described with the third switch 31 being configured as a p-type metal-oxide-semiconductor field-effect (PMOS) transistor. However, it is understood the present invention is not limited thereto. In the third switch 23, the first end 231 is a gate, the second end 232 is a source, and the third end 233 is a drain. The fourth switch 24 includes a second MOS transistor Q4, an eleventh resistor R11 and a twelfth resistor R12. The second MOS transistor Q4 has a source and a drain forming the second end 242 and the third end 243 of the fourth switch 24, respectively. The eleventh resistor R11 has an end connected to a gate of the second MOS transistor Q4 and an end of the twelfth resistor R12, and another end forming the first end 241 of the fourth switch 24. The twelfth resistor R12 has another end connected to ground. Wherein, the second MOS transistor Q4 in the preferred embodiment is configured as an n-type metal-oxide-semiconductor field-effect (NMOS) transistor.

The first voltage stabilizer 31 includes a first voltage reference diode Z1, a first capacitor C1, a first resistor R1, a second resistor R2, a third resistor R3, a fourth resistor R4, and a first transistor Q1. The first capacitor C1 has an end, to which the second end 212 (source) of the first switch 21, a cathode of the first voltage reference diode Z1, an end of the first resistor R1 and the input voltage Vin are commonly connected; and another end, to which the first end 211 (gate) of the first switch 21, an anode of the first voltage reference diode Z1 and another end of the first resistor R1 are commonly connected.

While the first voltage reference diode Z1 in the illustrated preferred embodiment is described as a Zener diode, it is understood the present invention is not limited thereto. In practical implementation of the present invention, the first voltage reference diode Z1 can be any element that can be used for voltage stabilizing. Therefore, by using the first voltage reference diode Z1 to stabilize the received input voltage Vin, it is able to maintain the turn-on voltage (Vgs) applied between the gate and the source of the first switch 21 in a constant state. As a result, the turn-on resistance (Rds) of the first switch 21 at the time it is turned on is reduced. Accordingly, the junction temperature (Tj) and the case temperature (Tc) of the first switch 21 also reduce along with the turn-on resistance (Rds). In this manner, it is able to effectively solve the problem of insufficiently derated junction temperature (Tj) of the first switch 21, and to effectively ensure that the voltage (Vgs) between the gate and the source (i.e. the first end 211 and the second end 212) of the first switch 21 does not exceed the allowable voltage specification thereof.

The second resistor R2 has an end connected to another end of the first resistor R1 and an end of the third resistor R3, and another end connected to another end of the third resistor R3 and a collector of the first transistor Q1. The first transistor Q1 also has a base and an emitter connected to an end of the fourth resistor R4 and the ground, respectively. The fourth resistor R4 has another end, at where a driving voltage output by the control IC 4 is received for driving or triggering the first transistor Q1 to turn on it.

Please refer to FIGS. 3 and 4 at the same time. The second voltage stabilizer 32 includes a second voltage reference diode Z2, a second capacitor C2, a fifth resistor R5, a sixth resistor R6, a seventh resistor R7, an eighth resistor R8, and a second transistor Q2. The second capacitor C2 has an end, to which the second end 232 (source) of the third switch 23, a cathode of the second voltage reference diode Z2, an end of the fifth resistor R5 and the input voltage Vin are commonly connected; and another end, to which the first end 231 (gate) of the third switch 23, an anode of the second voltage reference diode Z2 and another end of the fifth resistor R5 are commonly connected. Therefore, by using the second voltage reference diode Z2 to stabilize the received input voltage Vin, it is able to maintain the turn-on voltage (Vgs) applied between the gate and the source of the third switch 23 in a constant state. As a result, the turn-on resistance (Rds) of the third switch 23 at the time it is turned on is reduced. Accordingly, the junction temperature (Tj) and the case temperature (Tc) of the third switch 23 also reduce along with the turn-on resistance (Rds). In this manner, it is able to effectively solve the problem of insufficiently derated junction temperature (Tj) of the third switch 23, and to effectively ensure that the voltage (Vgs) between the first end 231 and the second end 232 of the third switch 23 does not exceed the allowable voltage specification thereof.

The sixth resistor R6 has an end connected to another end of the fifth resistor R5 and an end of the seventh resistor R7; and another end connected to another end of the seventh resistor R7 and a collector of the second transistor Q2. The second transistor Q2 has a base connected to an end of the eighth resistor R8, and an emitter receiving the driving voltage thereat. The eighth resistor R8 has another end for receiving an operating voltage output by the control IC 4. While the preferred embodiment is described with the operating voltage output by the control IC 4 being 5V, it is understood the present invention is not limited thereto.

As can be seen in FIGS. 3 and 4, the circuit structure of the present invention further includes a first diode D1, a second diode D2, a third voltage reference diode Z3, a third capacitor C3, a fourth capacitor C4, a fifth capacitor C5, and a twenty-first resistor R21. The third voltage reference diode Z3 has a cathode, to which an end of the fifth resistor R5 and an end of the third capacitor C3 are commonly connected. Cathodes of the first and second diodes D1, D2, and one ends of the fourth and fifth capacitors C4, C5 are commonly connected to the end of the third capacitor C3 that is connected to the cathode of the third voltage reference diode Z3. Another end of the third capacitor C3, another ends of the fourth and fifth capacitors C4, C5, and an anode of the third voltage reference diode Z3 are commonly connected to ground.

Further, anodes of the first and second diodes D1, D2 are connected to the input voltage Vin. The twenty-first resistor R21 has an end, to which the second end 222 of the second switch 22 and the second end 242 of the fourth switch 24 are commonly connected; and another end connected to ground. That is, the twenty-first resistor R21 has an end, to which the source of the first MOS transistor Q3 and the source of the second MOS transistor Q4 are commonly connected; and another end connected to ground.

The first booster 34 includes a first operational amplifier (OPA) OP1, a thirteenth resistor R13, a fourteenth resistor R14, a fifteenth resistor R15 and a sixteenth resistor R16. The first operational amplifier OP1 has a positive terminal, a negative terminal, an output terminal, a negative power supply terminal, and a positive power supply terminal. The negative power supply terminal is connected to ground and the positive power supply terminal receives a working voltage V1. The output terminal is connected to another end of the ninth resistor R9, i.e. the first end 221 of the second switch 22. The working voltage V1 is a voltage supplied by a voltage stabilizing circuit (not shown) connected to the positive power supply terminal. In the preferred embodiment, the present invention is described with the working voltage V1 being 12V.

The positive terminal of the first operational amplifier OP1 is connected to an end of the thirteenth resistor R13 and an end of the sixteenth resistor R16 while another end of the thirteenth resistor R13 receives the first signal transmitted by the control IC 4 and another end of the sixteenth resistor R16 is connected to ground. The negative terminal of the first operational amplifier OP1 is connected to an end of the fourteenth resistor R14 and an end of the fifteenth resistor R15 while another end of the fourteenth resistor R14 is connected to ground and another end of the fifteenth resistor R15 is connected to the output terminal of the first operational amplifier OP1 and another end of the ninth resistor R9.

By using the first operational amplifier OP1 to increase or boost the voltage of the received first signal and outputting the boosted first signal from the output terminal of the first operational amplifier OP1 to the first end 221 of the second switch 22, it is able to increase the turn-on voltage (Vgs) applied between the source and the gate of the first MOS transistor Q3 of the second switch 22 and accordingly, reduce the turn-on resistance (Rds) of the first MOS transistor Q3 at the time it is turned on. Correspondingly, the junction temperature (Tj) and the case temperature (Tc) of the first MOS transistor Q3 also reduce along with the turn-on resistance (Rds). In this manner, it is able to effectively solve the problem of insufficiently derated junction temperature (Tj) of the first MOS transistor Q3 of the second switch 22.

As shown in FIG. 4, the second booster 35 includes a second operational amplifier OP2, a seventeenth resistor R17, an eighteenth resistor R18, a nineteenth resistor R19, and a twentieth resistor R20. The second operational amplifier OP2 has a positive terminal, a negative terminal, an output terminal, a negative power supply terminal and a positive power supply terminal. In the second operational amplifier OP2, the negative power supply terminal is connected to ground, the positive power supply terminal is connected to the working voltage V1, and the output terminal is connected to another end of the eleventh resistor R11, i.e. the first end 241 of the fourth switch 24.

The positive terminal of the second operational amplifier OP2 is connected to an end of the seventeenth resistor R17 and an end of the twentieth resistor R20 while another end of the seventeenth resistor R17 receives the second signal transmitted by the control IC 4 and another end of the twentieth resistor R20 is connected to ground.

The negative terminal of the second operational amplifier OP2 is connected to an end of the eighteenth resistor R18 and an end of the nineteenth resistor R19 while another end of the eighteenth resistor R18 is connected to ground and another end of the nineteenth resistor R19 is connected to the output terminal of the second operational amplifier OP2 and another end of the eleventh resistor R11.

By using the second operational amplifier OP2 to increase or boost the voltage of the received second signal and outputting the boosted second signal from the output terminal of the second operational amplifier OP2 to the first end 241 of the fourth switch 24, it is able to increase the turn-on voltage (Vgs) applied between the source and the gate of the second MOS transistor Q4 of the fourth switch 24 and accordingly, reduce the turn-on resistance (Rds) of the second MOS transistor Q4 at the time it is turned on. Correspondingly, the junction temperature (Tj) and the case temperature (Tc) of the second MOS transistor Q4 also reduce along with the turn-on resistance (Rds). In this manner, it is able to effectively solve the problem of insufficiently derated junction temperature (Tj) of the second MOS transistor Q4 of the fourth switch 24.

Please refer to FIG. 4 along with FIG. 3. The control IC 4 has a first pin, a second pin, a third pin, a fourth pin, a fifth pin, a sixth pin, a seventh pin and an eighth pin. The first pin is a Hall pin connected to a Hall element 5 for receiving a Hall signal transmitted by the Hall element 5. The second pin is a high-side pin connected to another end of the fourth resistor R4 and the emitter of the second transistor Q2 for outputting the driving voltage thereto. The third pin is a VDD pin connected to another end of the eighth resistor R8 for outputting the operating voltage thereto. The seventh pin is a PWMB pin connected to another end of the thirteenth resistor R13 for outputting the first signal thereto. The eighth pin is a PWMB pin connected to another end of the seventeenth resistor R17 for outputting the second signal thereto.

While the preferred embodiment is described with the control IC 4 being configured to have eight pins, it is understood the present invention is not limited thereto. In practical implementation of the present invention, a user may, according to actual desired functional requirements, use a control IC having more pins, such as a control IC having ten pins, or a control IC having twelve or more pins.

Therefore, with the circuit structure of the present invention, it is able to effectively achieve the purpose of solving the problem of insufficiently derated junction temperature (Tj) of the first, the second, the third and the fourth switch 21, 22, 23, 24 and accordingly, to upgrade the heat dissipation ability of the first, the second, the third and the fourth switch 21, 22, 23, 24 in the motor driving unit 2. Further, with the upgraded heat dissipation ability of the first, the second, the third and the fourth switch 21, 22, 23, 24, it is also able to effectively ensure that the voltage (Vgs) between the first end 211 and the second end 212 of the first switch 21 as well as the voltage (Vgs) between the first end 231 and the second end 232 of the third switch 23 do not exceed the element specifications thereof.

In conclusion, the circuit structure for fan motor according to the present invention has the following advantages: (1) it has good heat dissipation ability; (2) the signal processing unit maintains the voltage (Vgs) between the gate and the source of the PMOS transistor of the motor driving unit in a stable state, so that the problem of insufficiently derated junction temperature (Tj) of the PMOS transistor can be effectively solved and it is ensured the turn-on voltage (Vgs) of the PMOS transistor does not exceed the element specification thereof; (3) the signal processing unit boosts the voltage (Vgs) between the gate and the source of the NMOS transistor of the motor driving unit, so that the problem of insufficiently derated junction temperature (Tj) of the NMOS transistor can be effectively solved.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A circuit structure enabling upgraded MOS transistor heat dissipation ability and applied to a motor, comprising:
    a motor driving unit including a first switch, a second switch, a third switch and a fourth switch, which respectively have a first terminal end, a second terminal end and a third terminal end; the first and the third switch being connected at their third ends to the third ends of the second and the fourth switch, respectively; and
    the first and the second switch being connected at their second ends to the second ends of the third and the fourth switch, respectively; and
    a signal processing unit including:
        a first voltage stabilizer having an end connected to the first end of the first switch and another end connected to the second end of the first switch and an input voltage for stabilizing a voltage between the first end and the second end of the first switch;
        a second voltage stabilizer having an end connected to the first end of the third switch and another end connected to the second end of the third switch and the input voltage for stabilizing a voltage between the first end and the second end of the third switch;
        a first booster connected to the first end of the second switch for boosting a received first signal and outputting the boosted first signal to the first end of the second switch; and
        a second booster connected to the first end of the fourth switch for boosting a received second signal and outputting the boosted second signal to the first end of the fourth switch.

2. The circuit structure as claimed in claim 1, wherein the first end, the second end and the third end of the first switch are a gate, a source and a drain, respectively.

3. The circuit structure as claimed in claim 2, wherein the first end, the second end and the third end of the third switch are a gate, a source and a drain, respectively.

4. The circuit structure as claimed in claim 3, wherein the first voltage stabilizer includes a first voltage reference diode, a first capacitor, a first resistor, a second resistor, a third resistor, a fourth resistor, and a first transistor; the first capacitor having a first end, to which the second end of the first switch, a cathode of the first voltage reference diode, a first end of the first resistor and the input voltage are commonly connected; the first capacitor having a second end, to which the first end of the first switch, an anode of the first voltage reference diode and a second end of the first resistor are commonly connected; the second resistor having a first end connected to the second end of the first resistor and a first end of the third resistor, and a second end connected to a second end of the third resistor and a collector of the first transistor; the first transistor having a base and an emitter connected to a first end of the fourth resistor and ground, respectively; and the fourth resistor receiving a driving voltage at a second end thereof.

5. The circuit structure as claimed in claim 4, wherein the second voltage stabilizer includes a second voltage reference diode, a second capacitor, a fifth resistor, a sixth resistor, a seventh resistor, an eighth resistor and a second transistor; the second capacitor having a first end, to which the second end of the third switch, a cathode of the second voltage reference diode, a first end of the fifth resistor and the input voltage are commonly connected; the second capacitor having a second end, to which the first end of the third switch, an anode of the second voltage reference diode and a second end of the fifth resistor are commonly connected; the sixth resistor having a first end connected to the second end of the fifth resistor and a first end of the seventh resistor, and a second end connected to a second end of the seventh resistor and a collector of the second transistor; the second transistor having a base connected to a first end of the eighth resistor and an emitter receiving the driving voltage thereat; and the eighth resistor having a second end for receiving an operating voltage thereat.

6. The circuit structure as claimed in claim 5, wherein the second switch includes a first MOS transistor, a ninth resistor and a tenth resistor; the first MOS transistor having a source and a drain forming the second end and the third end of the second switch, respectively; the ninth resistor having a first end connected to a gate of the first MOS transistor and a first end of the tenth resistor, and a second end forming the first end of the second switch; and the tenth resistor having a second end connected to ground.

7. The circuit structure as claimed in claim 6, wherein the fourth switch includes a second MOS transistor, an eleventh resistor and a twelfth resistor; the second MOS transistor having a source and a drain forming the second end and the third end of the fourth switch, respectively; the eleventh resistor having a first end connected to a gate of the second MOS transistor and a first end of the twelfth resistor, and a second end forming the first end of the fourth switch; and the twelfth resistor having a second end connected to ground.

8. The circuit structure as claimed in claim 7, wherein the first booster includes:
    a first operational amplifier having a positive terminal, a negative terminal, an output terminal, a negative power supply terminal, and a positive power supply terminal; the negative power supply terminal being connected to ground and the positive power supply terminal receiving a working voltage; and the output terminal being connected to the second end of the ninth resistor;

a thirteenth resistor having a first end connected to the positive terminal of the first operational amplifier and a second end receiving the first signal thereat;

a fourteenth resistor having a first end connected to the negative terminal of the first operational amplifier and a second end connected to ground;

a fifteenth resistor having a first end, to which the first end of the fourteenth resistor and the negative terminal of the first operational amplifier are commonly connected, and a second end connected to the output terminal of the first operational amplifier; and a sixteenth resistor having a first end, to which the positive terminal of the first operational amplifier and the first end of the thirteenth resistor are commonly connected, and a second end connected to ground.

9. The circuit structure as claimed in claim 8, wherein the second booster includes:

a second operational amplifier having a positive terminal, a negative terminal, an output terminal, a negative power supply terminal and a positive power supply terminal; the negative power supply terminal being connected to ground, the positive power supply terminal being connected to the working voltage, and the output terminal being connected to the second end of the eleventh resistor;

a seventeenth resistor having a first end connected to the positive terminal of the second operational amplifier, and a second end receiving the second signal thereat;

an eighteenth resistor having a first end connected to the negative terminal of the second operational amplifier, and a second end connected to ground;

a nineteenth resistor having a first end, to which the first end of the eighteenth resistor and the negative terminal of the second operational amplifier are commonly connected, and a second end connected to the output terminal of the second operational amplifier; and a twentieth resistor having a first end, to which the positive terminal of the second operational amplifier and the first end of the seventeenth resistor are commonly connected, and a second end connected to ground.

10. The circuit structure as claimed in claim 9, wherein the signal processing unit is connected to a control IC; the control IC having a first pin, a second pin, a third pin, a fourth pin, a fifth pin, a sixth pin, a seventh pin and an eighth pin; the first pin being connected to a Hall element for receiving a Hall signal transmitted by the Hall element; the second pin being connected to the second end of the fourth resistor and the emitter of the second transistor for outputting the driving voltage thereto; the third pin being connected to the second end of the eighth resistor for outputting the operating voltage thereto; the seventh pin being connected to the second end of the thirteenth resistor for outputting the first signal thereto; and the eighth pin being connected to the second end of the seventeenth resistor for outputting the second signal thereto.

11. The circuit structure as claimed in claim 10, wherein the first and the second signal are respectively a PWM signal.

12. The circuit structure as claimed in claim 10, wherein the first and the third switch are respectively a PMOS transistor.

13. The circuit structure as claimed in claim 10, wherein there is a first node formed at the connection between the third end of the first switch and the third end of the second switch, and the first node being electrically connected to an end of the motor; and wherein there is a second node formed at the connection between the third end of the third switch and the third end of the fourth switch, and the second node being electrically connected to another end of the motor.

14. The circuit structure as claimed in claim 5, further comprising a first diode, a second diode, a third voltage reference diode, a third capacitor, a fourth capacitor, a fifth capacitor and a twenty-first resistor; the third voltage reference diode having a cathode, to which the first end of the fifth resistor and a first end of the third capacitor are commonly connected; cathodes of the first and the second diode as well as first ends of the fourth and the fifth capacitor being commonly connected to the first end of the third capacitor; a second end of the third capacitor, second ends of the fourth and the fifth capacitor, and an anode of the third voltage reference diode being commonly connected to ground; anodes of the first and the second diode being connected to the input voltage; and the twenty-first resistor having a first end, to which the second ends of the second and the fourth switch are commonly connected, and a second end connected to ground.

15. The circuit structure as claimed in claim 7, wherein the first and the second MOS transistor are respectively an NMOS transistor.

\* \* \* \* \*